Nov. 28, 1950     E. DE LAY     2,532,015
TILTABLE WHEELED HANDCART
Filed Nov. 1, 1948     2 Sheets-Sheet 2
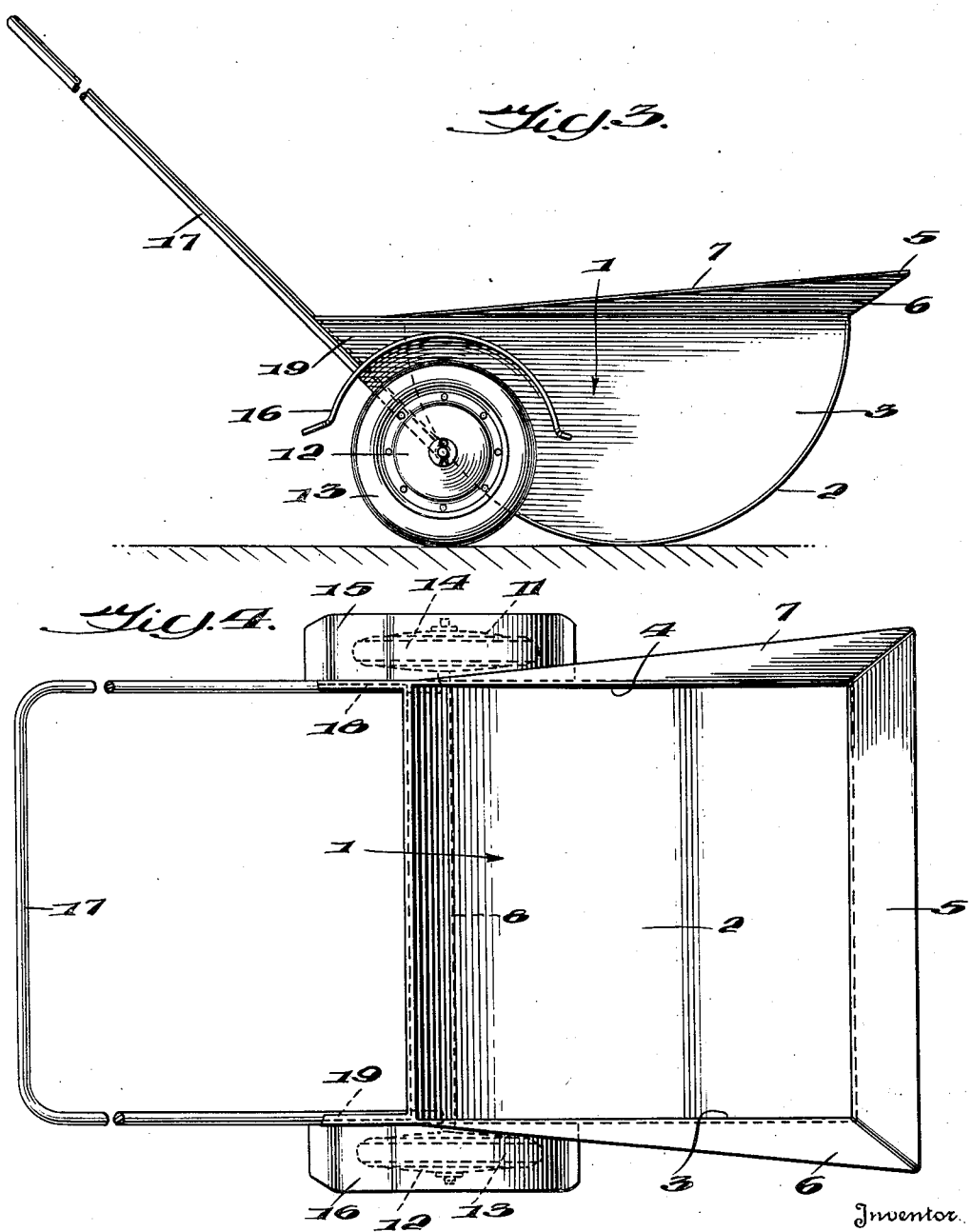
Inventor
EARL DE LAY,
By Parry & Miller
Attorneys Patented Nov. 28, 1950

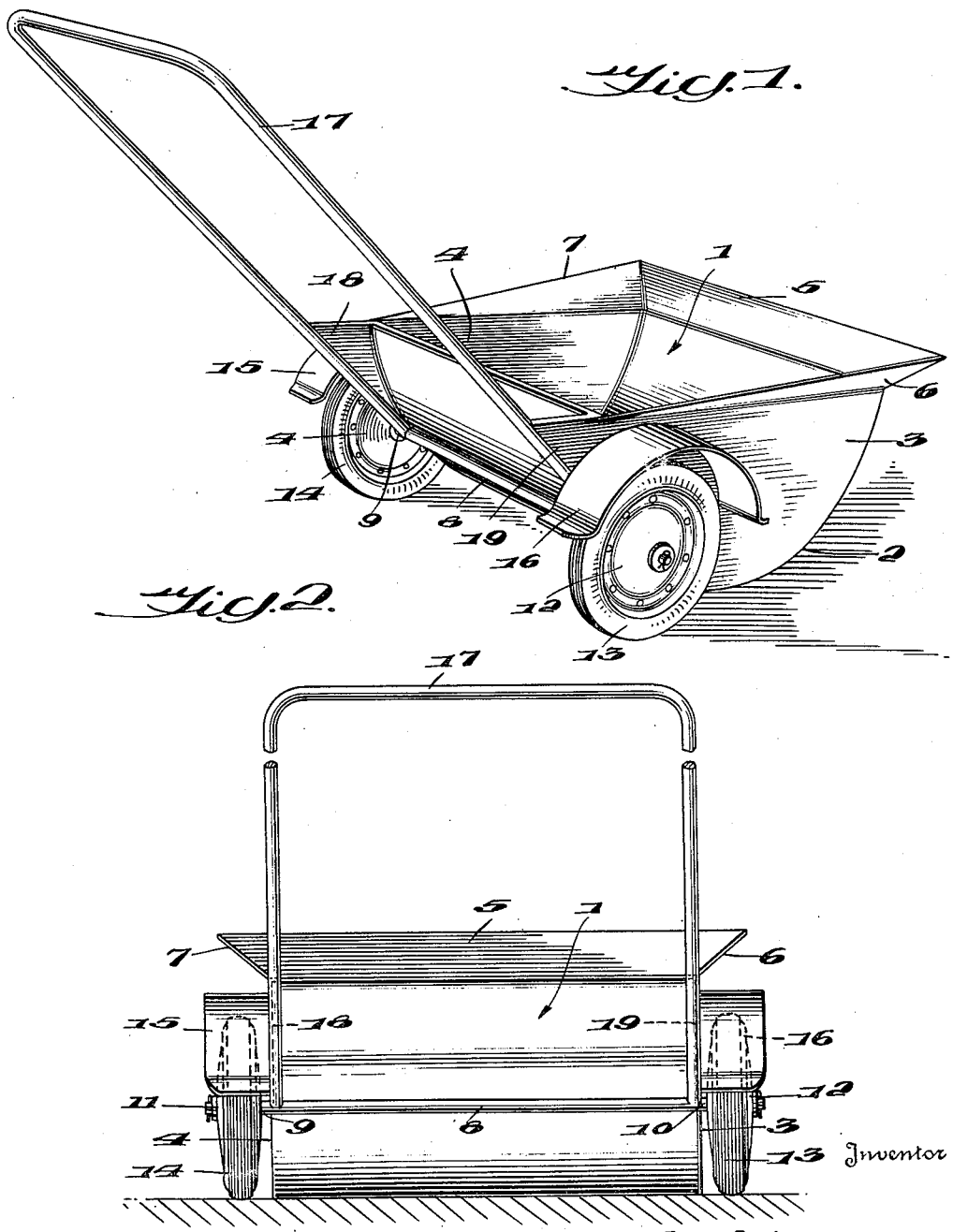

2,532,015

UNITED STATES PATENT OFFICE 2,532,015

TILTABLE WHEELED HANDCART

Earl De Lay, Columbia, S. C.

Application November 1, 1948, Serial No. 57,661

6 Claims. (Cl. 280—51)

This invention relates to carts and aims to provide improvements in carts particularly adapted to holding and transporting hot bitumen.

In the construction of tar and asphalt built-up roofs it is necessary for the worker to have close at hand a quantity of hot bitumen known as "Hot Stuff." The usual practice is to convey this material across the roof in small conveyor buckets and then dump it into a larger bucket or tub from which it may be mopped and ladled. The carrying of buckets of "Hot Stuff" across roofs is strenuous work and quite fatiguing to the worker since the small buckets weigh upward to 40 pounds when full and must be held clear of the legs. The larger tub when full weighs upward of 80 pounds and has to be lifted or shifted several hundred times a day. Besides being strenuous it is also dangerous as the material is heated to 300° F. to 400° F. and higher and a misstep and fall has sent many workers to the hospital severely burned and sometimes marked for life.

It is, therefore, a general object of the present invention to provide a cart suitable for holding and transporting hot bitumen and the like which will overcome these and other disadvantages of prior art methods and devices.

It is a further object of the invention to provide a cart which is so balanced that the weight at all times rests on the wheels or on the body and wheels thus allowing the operator to place all weight on the wheels and move the cart by a downward pressure on the handles.

It is a still further object of the invention to provide a cart in which the center of gravity is low and forward of the wheels and axle thereby making for ease of mobility with a minimum of push required to lift and move it.

It is another object of the invention to provide a cart having a rounded bottom to facilitate the handling and removing, by mop or bucket, of liquid materials.

It is still another object of the invention to provide a tar cart having means for draining excess bitumen from a mop or the like in an easy manner.

It is a further object of the invention to provide a cart having a handle member attached to the axle member, said handle member being constructed so that it can be gripped with both hands, and move in a comfortable position without bending over and said handle member further allowing sufficient distance between the cart and operator so that the operator will at no time impede his progress by bumping his feet against the cart.

Another object of the invention is to provide a cart having removable wheels provided with tires of rubber or similar material and fenders adapted to protect said tires from hot material splashed out of the cart.

It is still another object of the invention to provide a cart for handling hot bitumen which may be readily cleaned by removing the wheels and burning the scum out.

These and other objects and advantages of the invention will be apparent to persons skilled in the art from a consideration of the attached drawing and annexed specification illustrating and describing a preferred embodiment of the invention.

In the drawings:

Fig. 1 is a perspective view of the cart of the present invention;

Fig. 2 is an end view of the cart looking from the left in Fig. 1;

Fig. 3 is a side view of the cart looking from the right in Fig. 1; and

Fig. 4 is a top view of the cart of the present invention.

Although the cart of the present invention is particularly adapted for holding and transporting hot bitumen, tar and the like it is generally applicable to a wide variety of uses. Hence even though the description herein makes frequent reference to this field of use it is not to be construed as limited thereto.

In the handling of hot bitumen for roofing purposes and the like it is desirable to provide a receptacle or container which has sufficient capacity to run the operator a considerable length of time without refilling, but small enough so that the material therein may be used efficiently before it cools too much to be acceptable for applying to a roof. For this reason the body portion 1 of the cart desirably has a capacity which is a little more than half that of an ordinary wheelbarrow. Although such capacity is particularly suitable for this use other uses may require a smaller or larger capacity depending on the particular type of use.

The body portion has a rounded or concavely curved bottom portion 2 and side portions 3 and 4. The bottom portion 2 is preferably arcuate in shape when viewed from the side to facilitate removal of the hot bitumen with a mop or the like, since it has been found that trough-shaped bottoms such as are generally used on carts for transporting cement mixtures and the like are not suitable for this use.

Extending upwardly and outwardly from the upper forward edge of the bottom portion 2 and the upper edges of the side portions 3 and 4 are lips 5, 6 and 7, the lips 6 and 7 being connected to the lip 5 at their meeting edges to form a continuous flared lip around the upper portion of the front and sides of the body portion 1. The purpose of the lips 5, 6 and 7 is to facilitate draining of excess bitumen from a mop or the like. The body portion is desirably made of heavy gauge iron, the component parts preferably being welded together for maximum strength and safety.

Secured to the body portion 1 and specifically to the bottom portion 2, as by welding or other suitable means, is an axle 8. The axle 8 extends beyond the side portions 3 and 4 to provide bearing extensions 9 and 10. Wheels 11 and 12, which are preferably of the disc type provided with pneumatic rubber tires 13 and 14, are mounted on the bearing extensions 9 and 10, and secured thereon by cotter keys or similar means. Fenders 15 and 16, welded or otherwise secured to the side portions 3 and 4, cover the wheels 11 and 12 and protect the pneumatic tires from hot material which may be splashed from the body portion 1.

Secured to the axle 8, as by welding or other suitable means, is a handle 17. The handle 17 is preferably formed of tubing or pipe, bent in the shape of a U, the free ends thereof being secured at spaced points to the axle 8. The handle 17 is secured to the body portion 1 by flanges 18 and 19 which in a preferred form of construction constitute integral prolongations or extensions of the side portions 3 and 4. Welding or other suitable means may be used to secure the handle 17 to the axle 8 and the flanges 18 and 19.

The location, arrangement and size of the component parts of the device in accordance with the present invention are of considerable importance in obtaining proper functioning and results. Thus, it is essential that the axle 8 be positioned on the body portion 1 so that the center of gravity of the device, whether empty or loaded, is located forwardly thereof. This permits the bottom portion 2 to rest on a roof or other support when the handle 17 is released, the area of contact being sufficient to prevent sliding or rolling. Thus, the axle 8 is positioned at any suitable point to the rear of the center of gravity of the device but is desirably positioned as low as possible and sufficiently close thereto so that a slight downward pressure on the handle 17 will raise the body portion from its resting place on the roof and set the cart in motion. The size of the wheels 11 and 12 will depend somewhat on the location of the axle 8 and will be coordinated therewith so that the device will have a low center of gravity and so that the body portion 1 will be substantially level or have a slight slope forward when resting on a roof or similar support.

A important feature of the handle construction is its direct attachment to spaced points of the axle 8. This, together with its angle of inclination with respect to the axle and body, makes for easy handling and movement of the device merely by a slight downward pressure exerted along the line of the handle. The spaced connections of the handle 17 with the axle 8, together with the attachment of the handle to the body portion, gives added strength and rigidity to the device and likewise makes for easier handling. And finally, the handle 17 is so constructed and positioned that the operator may grasp it with both hands without bending over and move it from place to place with a minimum amount of effort and without striking his feet on the body portion.

With the improved cart of the present invention effort is reduced to a minimum. Although it holds considerably more material than the combined bucket and tub normally used for roofing it performs the function of both and never has to be slid or lifted. It is so well balanced that it will stand upright full or empty. With a gentle downward thrust of the handle, the body portion clears the roof and the cart becomes maneuverable. An easy push suffices to start the cart on its way. When the handle is released the cart settles into a firm working position. These features make the improved cart of the present invention a decided improvement in the art.

As stated hereinabove the cart of the present invention is particularly adapted for holding and carrying hot bitumen and the like. Compared to previous devices and methods used it is productive of great savings in time and labor and is much safer. It also saves waste through better temperature maintenance and a more efficient use of the material. The present cart is also adaptable to a wide variety of other uses which are intended to be covered herein.

Various modifications of the invention described and illustrated will most likely occur to those skilled in the art to which the invention relates and may be made without departing from the spirit of the invention, the scope of which is indicated in the attached claims.

I claim:

1. A cart comprising a body portion having a rounded bottom, an axle secured to said rounded bottom adjacent one end thereof, said axle being positioned rearwardly of the center of gravity of said cart whereby said rounded bottom will normally rest on a supporting surface, wheels mounted on said axle, the size of said wheels and position of said axle being such that the upper marginal edges of said body portion are substantially level when said rounded bottom is resting on a supporting surface, a handle extending upwardly and rearwardly from said body portion, and means securing said handle to said body portion.

2. A cart comprising a body portion having an arcuate shaped bottom, an axle secured to said bottom rearwardly of the center of gravity of said cart and having portions thereof extending beyond the sides of said body portion, wheels mounted on the extended portions of said axle, and a handle comprising a U-shaped member having the free ends of the legs thereof secured to opposite end portions of said axle, said handle extending upwardly rearwardly of said body portion to permit grasping by an operator and flange means extending rearwardly from said body portion and secured to said handle adjacent the free end portions thereof, said body portion adapted to normally rest on the ground with the upper marginal edges thereof substantially parallel therewith but movable away from the ground to carrying position by a slight downward movement of the handle.

3. A cart for holding and transporting hot bitumen and the like comprising a body portion having a rounded bottom, an axle secured to said rounded bottom adjacent one end thereof and having portions thereof extending beyond the sides of said body portion, said axle being positioned rearwardly of the center of gravity of said cart whereby the rounded bottom will normally rest on a supporting surface, wheels mounted on the extended portions of said axle the size of said wheels and position of said axle along said rounded bottom being such that the upper marginal edges of said body portion are substantially level when the rounded bottom is resting on a supporting surface, a handle extending upwardly rearwardly of said body portion, and means extending rearwardly from said body portion for securing the handle thereof.

4. A cart as set forth in claim 3 including lips attached to the upper marginal edges of said body portion and extending outwardly and upwardly therefrom.

5. A cart for holding and transporting hot bitumen and the like comprising a relatively shallow body portion, said body portion having connecting arcuate-shaped bottom and end portions and substantially straight side portions, an axle secured to the rear portion of said arcuate-shaped bottom and having portions thereof extending beyond said substantially straight side portions, said axle being positioned rearwardly of the center of gravity of said cart whereby the arcuate-shaped bottom will normally rest on a supporting surface, wheels mounted on the extended portions of said axle, the size of said wheels and position of said axle being such that the upper marginal edges of said body portion are substantially level when the arcuate-shaped bottom is resting on a supporting surface, a handle comprising a U-shaped member having its free ends secured to opposite end portions of said axle, said handle extending upwardly rearwardly of said body portion, rearward extensions on the sides of said body portion and means connecting said handle to said rearward extensions.

6. A cart comprising a body portion having a rounded bottom, an axle secured to said rounded bottom intermediate the ends thereof, and having wheels mounted thereon, the size of said wheels, position of said axle, and shape of said body portion being such that the rounded bottom thereof will normally rest on the ground with the upper marginal edges thereof slightly inclined thereto, a handle extending upwardly and rearwardly from said body portion and secured thereto, said handle being movable downwardly by pressure thereon to raise said body portion from the ground to operative carrying position with the upper marginal edges thereof substantially level.

EARL DE LAY.

REFERENCES CITED

The following references are of record in the file of this patent:

UNITED STATES PATENTS

| Number | Name | Date |
|---|---|---|
| 1,005,617 | Doud | Oct. 10, 1911 |
| 1,015,969 | McCrary | Jan. 30, 1912 |
| 1,513,045 | Jordan et al. | Oct. 28, 1924 |
| 1,815,244 | Dodge | July 21, 1931 |
| 2,121,224 | Garlinghouse, Jr. | June 21, 1938 |
| 2,189,079 | Mueller et al. | Feb. 6, 1940 |
| 2,431,834 | Sinclair | Dec. 2, 1947 |

FOREIGN PATENTS

| Number | Country | Date |
|---|---|---|
| 481,758 | Great Britain | Mar. 17, 1938 |